June 17, 1924.　　　　　　　　　　　　　　　　　　1,498,036
A. L. HOLTON
LIFTING JACK FOR MOTOR VEHICLES
Filed Jan. 24, 1922
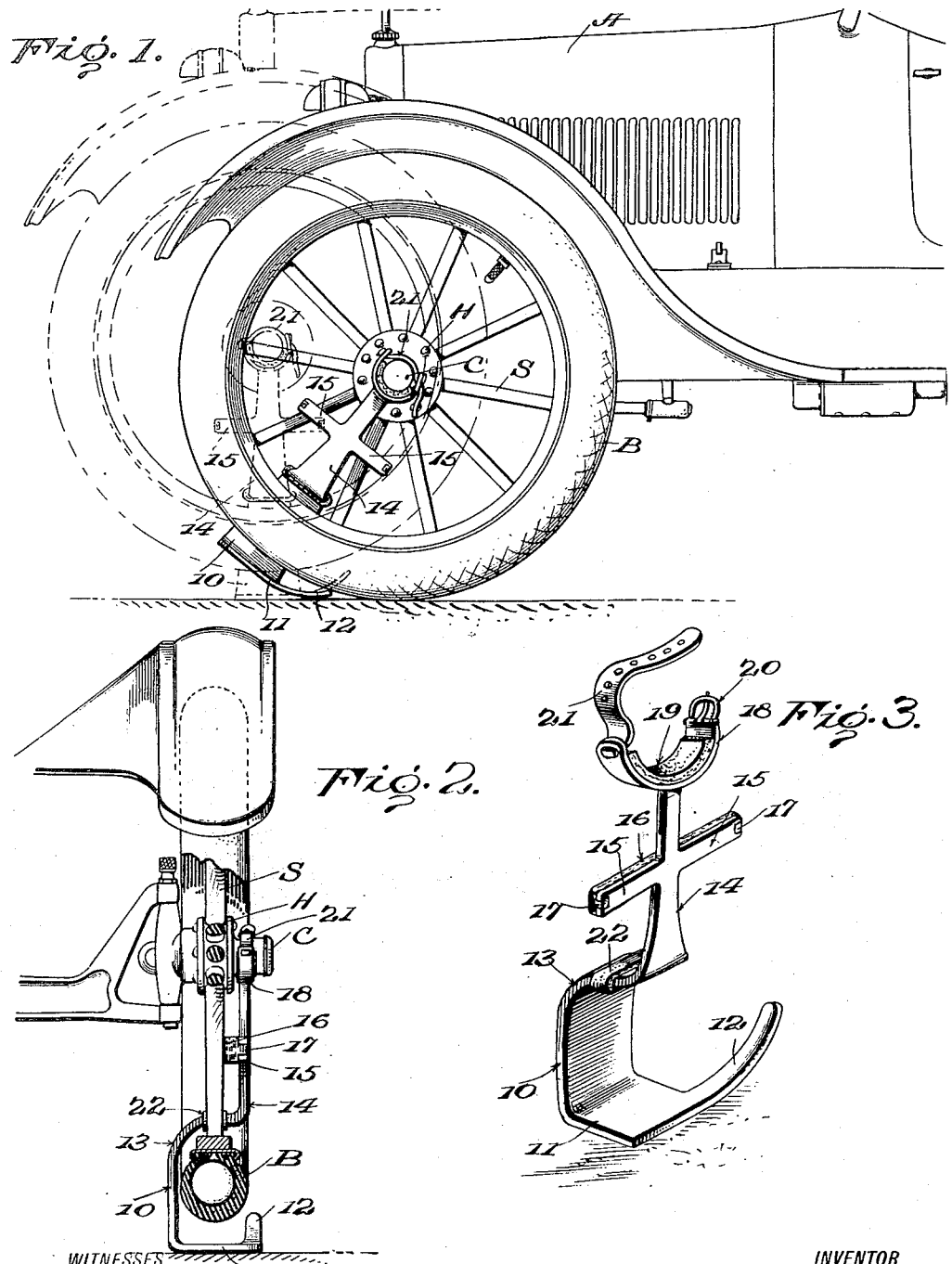
INVENTOR
A. L. Holton.
BY
ATTORNEYS
WITNESSES Patented June 17, 1924.

1,498,036

UNITED STATES PATENT OFFICE.

ABNER L. HOLTON, OF BIG STONE GAP, VIRGINIA.

LIFTING JACK FOR MOTOR VEHICLES.

Application filed January 24, 1922. Serial No. 531,497.

*To all whom it may concern:*

Be it known that I, ABNER L. HOLTON, a citizen of the United States, and a resident of Big Stone Gap, in the county of Wise and State of Virginia, have invented certain new and useful Improvements in Lifting Jacks for Motor Vehicles, of which the following is a specification.

This invention relates to a lifting jack for motor vehicles or the like.

The invention more particularly relates to the type of lifting jack in which the motive power of a vehicle is utilized for elevating one or more of its wheels and has for its object to provide such a device which may be quickly and easily applied to either a rear or front wheel of a motor vehicle and serve to elevate said wheel a predetermined degree when the motor vehicle is advanced or moved rearward a sufficient degree.

It is also an important object of the invention that the lifting device when applied to a wheel of a motor vehicle for elevating the same that no parts of the wheel will be subjected to an undue strain.

It is a further object of the invention that the device be adapted to in no way mar or scratch a wheel to which the same may be applied for lifting said wheel.

It is also within the scope of the invention that the device be extremely simple in construction and inexpensive to manufacture.

Other objects and advantages relating to details of construction, combination and arrangement of parts will hereinafter appear.

The invention is illustrated by way of example in the accompanying drawings, in which:—

Figure 1 is a view in side elevation of the front portion of an automobile illustrating the application of the lifting device to a front wheel previous to lifting the front wheel in full lines, and also showing in dotted lines the relative position of the lifting device and wheel after the wheel has been elevated.

Figure 2 is a fragmentary front elevation of the view shown in Figure 1 and with parts broken away to more clearly illustrate the application of the invention, Figure 3 is a detailed perspective view of the lifting device.

Referring to the drawings more particularly, A indicates generally the body of an automobile and B a front wheel thereof. The wheel B is of the spoke type, said spokes being indicated at S. The spokes terminate at their inner end in the usual hub H which may be of any construction and upon which there is carried the usual cap C.

In carrying out the present invention there is provided a substantially U-shaped body member 10, or what may be termed a "shoe," which is preferably of the width shown in Figure 2, and its one leg portion 11 terminating at its free end in an arcuate projection or finger 12, said finger preferably extending from the leg portion 11 at the point shown. The other leg 13 of the U-shaped member terminates at its outer end in an arm 14 which extends substantially at right angles to the leg portion 13 and which in turn has extending therefrom a pair of arms 15 which are in alignment with each other and have their one side covered by a strip of rubber 16, said rubber being formed at each end with a suitable lug 17 which projects into a suitable recess formed in the end of the associated arm 15 as illustrated in Figure 3, and in this manner the rubber strip 16 is held against displacement. The rubber strip 16 may of course be easily taken off and renewed if necessary. The upper end of the arm 14 terminates in an arcuate portion 18 which may be secured to the arm 14 in any suitable manner and which has its inner periphery covered with rubber or felt as at 19. The one end of the arcuate portion 18 is provided with a buckle 20 and to its other end there is suitably secured a strap 21. The arcuate shaped portion 18 is to serve as a support to a wheel after the same has been elevated in a manner which will later more fully appear; and the construction of the arm 14 and said portion 18' is made of corresponding strength.

Also the leg portion 13 of the U-shaped member 10 has fitted thereabout at a point intermediate its ends a rubber strip 22 to serve as a bumper in a manner which will presently be explained.

When it is desired to use the present lifting device, the same should be applied as shown in full lines in Figure 1. The U-shaped body portion 10 has been inserted between a pair of spokes S of the wheel B and the portion 18 brought to surround the wheel hub H at a point adjacent the cap C as best shown in Figure 2 and so secured by the strap 21. The arms 15 are then positioned upon the outer side of the associated pair of spokes S. In case it is intended to inflate or change the tire of the wheel B then the lifting device should be positioned diametrically opposite to the inflation valve of the wheel as shown in Figure 1.

In Figure 1 the arcuate finger 12 formed with the leg portion 11 of the U-shaped body member 10 extends rearwardly and toward the tire of the wheel B. As is obvious after the vehicle is moved forward under its own motive power the finger 12 will first engage the earth or foundation upon which the wheels B rest and thus with the further rotation of the wheel will gradually elevate the same to the position shown in dotted lines. The finger 12 eliminates any great jolt with the engagement of the body member 10 with the foundation or earth upon which the wheel B may be disposed and is of particular importance for this purpose. The arm 14 will of course move about the hub H until its bumper 22 engages with one of the spokes S of the wheel and then the device as a whole will be held in a rigid manner for elevating the wheel. It would of course depend upon the direction in which the wheel B is rotated to determine which side of the U-shaped member 10 would engage with a spoke S. In either event the lifting device would be rigidly held and the bumper 22 would eliminate any possibility of marring the part on the spokes with which it would engage. Also as is obvious the rubber 16 covering the inner side of the arms 15 would eliminate any possibility of the spokes S being scratched when said arms would move thereover.

It may be further mentioned that the device of the present invention may be quickly removed, and after it has performed its function of lifting a wheel that it may be easily stored in the tool chest of an automobile.

The invention has been illustrated when associated with a front wheel of a motor vehicle for lifting the same, but it is to be understood that it is adapted for lifting the rear wheels of an automobile with the same advantages. It is thought that the application of the device to a rear wheel of a motor vehicle is entirely apparent.

What I claim is:

1. In combination with a motor vehicle wheel, a substantially U-shaped shoe adapted to fit about the tire and felly of said wheel with the bridge portion upon the inner side thereof, an arm extending upwardly from the uppermost leg of said U-shaped shoe and carrying at its free end an arcuate shaped supporting portion adapted to engage beneath the hub of said wheel adjacent the outer end of said hub, a pair of arms extending from the upwardly extending arm adapted to engage the outer side of a pair of associated spokes of said wheel, means loosely connecting the upper end of the supporting arm of the hub of said wheel whereby with the rotating of said wheel to a predetermined position to bring the shoe and supporting arm extending therefrom to a vertical position, the associated wheel will be elevated.

2. A device of the character described comprising a substantially U-shaped shoe having extending from its one side a supporting arm at substantially right angles thereto, and means carried upon the free end of said supporting arm whereby the same may be loosely connected to a wheel hub.

3. A device of the character described comprising a substantially U-shaped shoe having extending from its one side a supporting arm at substantially right angles thereto, means carried upon the free end of said supporting arm whereby the same may be loosely connected to a wheel hub, and a pair of arms extending from said supporting arm having their inner sides covered with rubber or the like.

4. A device of the character described comprising a substantially U-shaped shoe having extending from its one side a supporting arm at substantially right angles thereto, means carried upon the free end of said supporting arm whereby the same may be loosely connected to a wheel hub, a pair of arms extending from said supporting arm having their inner sides covered with rubber or the like, and a resilient band extended about the uppermost leg portion of said U-shaped shoe.

5. A wheel elevating device comprising a shoe adapted to be positioned upon one side of a wheel, an arm extending from the shoe and adapted to be disposed upon the other side of the wheel and to engage the hub of said wheel for elevating the same when the wheel is rotated to bring the shoe therebeneath, and means carried by said arm adapted to cooperate with the shoe for holding the device upon said wheel against lateral movement in either direction.

6. A wheel elevating device comprising a shoe adapted to be positioned upon one side of the wheel, an arm emanating therefrom in offset relation thereto and adapted to be disposed upon the other side of the wheel and to engage the wheel for elevating the same when said wheel is rotated to bring the shoe therebeneath, and means carried by said arm adapted to cooperate with the shoe for holding the lifting device upon the wheel against lateral movement in either direction.

7. A wheel elevating device comprising a shoe adapted to be passed between a pair of adjacent spokes of a wheel and positioned upon one side of the wheel, and means emanating from said shoe adapted to be positioned upon the opposite side of the wheel and engage the hub of wheel to support said wheel when the same is rotated to bring the shoe therebeneath.

8. In combination with a motor vehicle, a U-shaped shoe adapted to fit about the felly and tire of a wheel of said motor vehicle, the bridge portion thereof being disposed upon the inner side of the wheel, an arm extending upwardly from the shoe and adapted to be loosely connected to the hub of said wheel whereby when said vehicle is moved in a predetermined direction to bring the shoe and supporting arm in a vertical position, said wheel will be elevated and supported by said shoe, and a curved finger extending from the shoe for the purpose described.

9. A wheel elevating device comprising a shoe adapted to be positioned upon one side of a wheel, means emanating from the shoe adapted to engage the other side of a wheel and to support the same when said wheel is rotated to bring the shoe therebeneath, and a curved finger extending from said shoe for the purpose described.

10. A one piece wheel elevating device comprising a shoe, an extension in the form of a cross emanating therefrom and having its longitudinal portion terminating in a semi-circular member.

11. A one piece wheel elevating device comprising a U-shaped shoe, an extension extending from one leg of said shoe, said extension being in the form of a cross and its longitudinal portion terminating in a semi-circular member.

12. A wheel elevating device comprising a shoe adapted to be passed between a pair of adjacent spokes of the wheel, an extension emanating from said shoe in the form of a cross adapted to be disposed on the other side of the wheel from that of the shoe and engage the spokes of the wheel so that said device will be held against lateral movement, and means carried by said extension adapted to engage the hub of the wheel and elevate the same when said wheel is rotated to bring the shoe therebeneath.

ABNER L. HOLTON.